United States Patent
Montalbano

(10) Patent No.: US 8,795,838 B2
(45) Date of Patent: Aug. 5, 2014

(54) COMPOSITE MATERIAL FOR OPTICAL USE AND METHOD FOR OBTAINING SAME

(75) Inventor: Franck Montalbano, Veyziat (FR)

(73) Assignee: Christian Dalloz Sunoptics, Saint-Claude (FR)

( * ) Notice: Subject to any disclaimer, the term of this patent is extended or adjusted under 35 U.S.C. 154(b) by 0 days.

(21) Appl. No.: 13/580,210

(22) PCT Filed: Mar. 4, 2011

(86) PCT No.: PCT/FR2011/000118
§ 371 (c)(1),
(2), (4) Date: Aug. 21, 2012

(87) PCT Pub. No.: WO2011/107678
PCT Pub. Date: Sep. 9, 2011

(65) Prior Publication Data
US 2012/0315490 A1 Dec. 13, 2012

(30) Foreign Application Priority Data

Mar. 4, 2010 (FR) .................................... 10 00875

(51) Int. Cl.
*B32B 27/40* (2006.01)
*B05D 3/02* (2006.01)

(52) U.S. Cl.
USPC ................ 428/423.7; 428/425.5; 427/387

(58) Field of Classification Search
USPC .................. 428/425.5, 423.7; 427/387
See application file for complete search history.

(56) References Cited

U.S. PATENT DOCUMENTS

| 6,333,821 | B1 | 12/2001 | Kruger et al. |
| 2003/0182738 | A1 | 10/2003 | Pyles et al. |
| 2006/0056022 | A1 | 3/2006 | Yeo et al. |
| 2006/0222847 | A1* | 10/2006 | Tanaka et al. ................ 428/336 |
| 2006/0287484 | A1 | 12/2006 | Crawford et al. |
| 2010/0003508 | A1* | 1/2010 | Arrouy et al. ................ 428/336 |
| 2011/0043748 | A1 | 2/2011 | Maisonhaute et al. |
| 2012/0170258 | A1* | 7/2012 | VanDuinen et al. ..... 362/217.02 |

FOREIGN PATENT DOCUMENTS

| EP | 1 162 245 A1 | 12/2001 |
| WO | WO 2009/138592 A1 | 11/2009 |

OTHER PUBLICATIONS

International Search Report issued in International Patent Application No. PCT/FR2011/000118 dated Jul. 6, 2011.

* cited by examiner

*Primary Examiner* — Thao T. Tran
(74) *Attorney, Agent, or Firm* — Oliff PLC

(57) ABSTRACT

A composite material for optical use as well as the method for obtaining it. This material includes a substrate made from a thermoplastic copolyester, a layer of polyurethane bonding primer, and a silicone anti-scratch varnish; advantageously, this varnish has hydroxyl groups, aliphatic CH groups, ester groups, and siloxane groups without methyl groups. This material makes it possible to produce optical pieces, in particular sunglasses, particularly solar glasses, as well as eyeshades for helmets or masks.

9 Claims, No Drawings

COMPOSITE MATERIAL FOR OPTICAL USE AND METHOD FOR OBTAINING SAME

The present invention relates to a new composite material for optical use, as well as the method for obtaining it.

In the field of solar glass made from organic materials, one of the most widespread transformation methods consists of injecting, under high pressure, substrates from the thermoplastic polymer family. Historically, a large number of organic materials belonging to this family of thermoplastic polymers have been used to manufacture optical pieces, and in particular solar glasses: polymethyl methacrylate (PMMA), commonly called "Plexiglas," Cellulose Propionate (CP), Acetobutyrate (CAB).

In the segment of top-of-the-line sunglasses, mineral glass was the reference material for some time, until the appearance of the first thermosetting organic glasses, substrates obtained by (co)polymerization of the bis(allyl) carbonate of diethyleneglycol, sold, for example, under the commercial name CR-39® by the company PPG Industries. More recently, the manufacturers of top-of-the-line sunglasses have wished to use lighter and less fragile substrates than mineral glass, and also substrates that are more shock resistant and impact resistant at high speeds than CR-39®.

This demand was met with the development of the thermoplastic material injection method for optical applications. First, and starting in the 1970s, the company Christian Dalloz proposed the Cridalon® glasses, manufactured from polycarbonate (PC), on the eyewear optics market for individual and sun protection use. Approximately 20 years later, another thermoplastic material appeared: amorphous homo- and co-polyamide, commonly called polyamide.

Each of these two thermoplastic organic polymers, which have gradually been substituted for the traditional materials (mineral and organic thermosetting glass), have advantages and drawbacks.

Polycarbonate is easily injected in all types of forms (ocular or screens) and has very good impact resistance. However, it cannot be used in all frames, as it is very sensitive to stress cracking, a phenomenon due to the localized internal and external strains that create areas of lower resistance. Furthermore, polycarbonate is not compatible with cellulose acetate, which is widely used to manufacture frames in the fashion and luxury field.

Polyamide has the advantage of not being sensitive to stress cracking and of being compatible with acetate. However, it is two times less resistant to impacts then polycarbonate and is more difficult to transform. From a financial standpoint, polyamide is much more expensive than polycarbonate and requires specific facilities to be transformed.

European patent application EP 1 162 245 describes an optical element including a substrate, a primary fastening layer made from polyurethane, and a silicone anti-scratch varnish layer, but the substrate used does not meet the applicant's goals.

The present invention relates to a polymer other than polycarbonate or polyamide, i.e. a thermoplastic material from the family of cycloaliphatic copolyesters obtained from the polycondensation of two alcohols and an acid, where the alcohols and the acid are aliphatic. U.S. Pat. No. 6,333,821 describes a certain number of these cycloaliphatic copolyesters, but the latter have the drawback of having a high glass transition temperature (above 180° C.). Furthermore, and in light of the method for obtaining those copolyesters as described in U.S. Pat. No. 6,333,821, the concerned copolyesters are not thermoplastic materials, whereas that is the type of material sought by the applicant.

It was therefore necessary to look for another thermoplastic cycloaliphatic copolyester, having a substantially lower glass transition temperature, which is the case for the thermoplastic cycloaliphatic copolyester of dimethyl terephthalate-1,4-cyclohexanedimethanol-2,2,4,4-tetramethylcyclobutane-1,3-diol developed and sold by the Eastman Chemical Company under the trademark TRITAN. This new material has the advantages of polyamide, combined with an ease of implementation close to polycarbonate, and with a glass transition temperature in the vicinity of 115° C.

However, this copolyester alone cannot be used to manufacture solar glasses or other optical glasses.

The present invention therefore relates to a copolyester-based composite material processed so as to make it suitable for the manufacture of solar glasses or other optical glasses.

The present invention also relates to a method for obtaining the copolyester-based composite material, of the type of that marketed under the brand TRITAN.

It has in fact appeared that this copolyester, when used alone, was not an anti-scratch material by nature, which is not allowable for the "top-of-the-line solar glass" application; it was therefore necessary to coat it with an anti-scratch varnish layer. To that end, the anti-scratch varnishes from the polysiloxane family are most commonly used in the field of solar glasses and do not pose any particular problems related to their application.

However, quite surprisingly, a large number of anti-scratch varnishes from the polysiloxane family were tested, but were not suitable when they were applied on a copolyester substrate, as they did not adhere to that substrate.

Among these anti-scratch varnishes from the polysiloxane family, two very commonly used varnishes can be cited.

The first of these varnishes that was tested is a silicone varnish having aliphatic CH groups and a high content of methyl groups of a polydimethylsiloxane chain.

The recommendations from the manufacturer of this varnish regarding its use on polycarbonate are the following:
Bath T ° C.: 20° C.
Thickness: 3 to 5 microns
Drying: 30 mn at 20° C. (gelification)
Curing: 1 h 40 at 123° C.

This varnish was tested on the copolyester substrate with different parameters in terms of thickness, curing time and curing temperature, but, contrary to expectations, did not show any adhesion. The use of a bonding primer is not recommended for this varnish.

The second varnish tested was also a silicone varnish having hydroxyl groups, aliphatic CH groups, ester groups, and siloxane groups with methyl groups having a lower content than the preceding one.

The manufacturer's recommendations regarding the application of this varnish on polycarbonate are the following:
Bath T ° C.: 20° C.
Thickness: 3 to 5 microns
Dry: 30 mn at 20° C. (gelification)
Curing: 1 h 40 at 123° C.

As before, this varnish was tested on the copolyester substrate with different parameters in terms of thickness, curing time and curing temperature, but, here again contrary to expectations, did not show any adhesion. The use of a bonding primer is not recommended for this varnish.

In both cases of non-adhesion, no scientific explanation could be found.

Faced with these repeated failures, it was decided to use another anti-scratch varnish from the polysiloxane family; in the case at hand, a silicone varnish was used having hydroxyl groups, aliphatic CH groups, ester groups, and siloxane groups without methyl groups.

The manufacturer's recommendations regarding the application of this varnish on polycarbonate are the following:
Bath T ° C.: 20° C.
Thickness: 3 to 5 microns
Drying: 30 mn at 20° C. (gelification)
Curing: 3 h at 129° C.

The manufacturer of this varnish recommends a bonding primer; it is a polyurethane primer including additives.

The manufacturer(s) recommendations for applying this bonding primer are the following:
Bath T ° C.: 19° C.
Thickness: 1 micron
Drying: 10 mn at 50-70° C. (gelification)
Curing: no curing The use of the last cited varnish, used with its bonding primer on the TRITAN copolyester substrate under the conditions recommended by the manufacturer, led to good adhesion of the varnish, but deformation of the pieces, since the copolyester has a glass transition temperature in the vicinity of 115° C.

New research was therefore necessary to have both good adhesion and no deformation of the copolyester pieces during the curing operation of the varnish. After numerous tests, it was finally discovered that the curing temperature range was astonishingly narrow; in fact, curing in the vicinity of 130° C., as recommended by the manufacturer, deforms the pieces, whereas a lower temperature, in the vicinity of 90-95° C. for example, did not lead to deformation of the pieces, but did not allow correct adhesion of the anti-scratch varnish on the copolyesters substrate. The curing temperature ultimately selected is between 100 and 110° C., and advantageously approximately 105° C.

Different techniques can be used to apply the varnish described above on the glasses comprising the substrate and the bonding primer, i.e.:
"dip coating": the glasses are dipped in a varnish bath;
"flow coating": the glasses receive a jet of varnish that flows by gravity over the entire surface;
"spray coating": the glasses receive varnish by spray;
"spin coating": the glasses receive a drop of varnish that extends over the entire surface by rotating the glass around itself.

The new composite material according to the present invention may remain colorless or can be tinted; the tinting may be done either by adding colored pigments, in particular during injection, or by dipping in a colored bath.

It should also be noted that the varnish used in the composite material according to the present invention is compatible with different vacuum surface treatments, whether colored treatments for cosmetic purposes, or functional treatments for anti-reflection purposes, for example, or special treatments such as depositions of precious metals, in particular gold.

Lastly, in the present invention, reference has been made to the copolyester sold under the trademark TRITAN to form the substrate of the composite material according to the present invention. It is understood that, without going beyond the scope of the present invention, other thermoplastic copolyesters, i.e. having physical and/or chemical characteristics close to those of the TRITAN copolyester, but having a higher glass transition temperature while remaining in the domain of thermoplastic materials, could be used as substrate for said composite material. In the case where the glass transition temperature of the thermoplastic copolyester is higher than that of the TRITAN copolyester, the method for obtaining the composite material would be slightly modified by adopting a curing temperature of the varnish slightly lower than the glass transition temperature of the thermoplastic copolyester used.

Various optics pieces can be made from the composite material according to the present invention, and may involve eyeglass lenses, in particular solar glasses, or eyeshades for masks or helmets.

The invention claimed is:

1. A composite material for optical use, comprising:
   a. a substrate comprising a thermoplastic cycloaliphatic copolyester of dimethyl terephthalate-1,4-cyclohexanedimethanol-2,2,4,4-tetramethylcyclobutane-1,3-diol;
   b. a layer of polyurethane bonding primer;
   c. a silicone anti-scratch varnish.

2. The composite material according to claim 1, wherein the silicone varnish has hydroxyl groups, aliphatic CH groups, ester groups, and siloxane groups without methyl groups.

3. The composite material according to claim 1 further comprising a tint.

4. The composite material according to claim 1, wherein the composite material has undergone a vacuum surface treatment.

5. A method for obtaining the composite material according to claim 1 comprising:
   a. applying a polyurethane bonding primer on the copolyester substrate;
   b. depositing a silicone anti-scratch varnish film on the primer;
   c. curing the varnish at a temperature slightly below the glass transition temperature of the copolyester.

6. The method for obtaining the composite material according to claim 5, wherein the varnish is cured at a temperature of 100 to 110° C.

7. The method according to claim 6, wherein the varnish is cured at a temperature around 105° C.

8. The method according to claim 5, wherein the varnish is applied on the bonding primer, which itself is arranged on the substrate, using one of the following techniques: dip coating, flow coating, spray coating, or spin coating.

9. Optical pieces comprising the composite material according to claim 1.

* * * * *